United States Patent [19]

Fisch et al.

[11] 4,060,987
[45] Dec. 6, 1977

[54] TURBINE DRIVE SYSTEM

[76] Inventors: Shlomo Chaim Fisch, 264 Penn St.; Ichak Fisch, 266 Hooper St., both of Brooklyn, N.Y. 11211

[21] Appl. No.: 761,417

[22] Filed: Jan. 21, 1977

Related U.S. Application Data

[63] Continuation-in-part of Ser. No. 581,819, May 29, 1975, abandoned.

[51] Int. Cl.² .................... F15B 11/06; F15B 11/18
[52] U.S. Cl. ........................................ 60/409; 60/412; 60/483; 415/141; 418/153
[58] Field of Search ............... 60/325, 407, 408, 409, 60/410, 412, 413, 418, 419–431, 624, 437, 438, 668, 716, 698, 701; 180/44 M, 44 F, 65 B, 65 C; 415/140, 141; 416/201; 418/153, 154, 156

[56] References Cited

U.S. PATENT DOCUMENTS

| 816,487 | 3/1906 | Lumgair | 415/198 UX |
|---|---|---|---|
| 2,023,524 | 12/1935 | Heaton | 60/438 |
| 2,679,854 | 6/1954 | Stevenson | 60/418 X |
| 2,843,049 | 7/1958 | Sherwood | 418/153 |
| 3,211,103 | 10/1965 | Kiekhaefer | 418/153 |
| 3,379,008 | 4/1968 | Manganaro | 60/408 X |
| 3,391,678 | 7/1968 | Luckhardt | 415/141 X |
| 3,692,429 | 9/1972 | Redding | 416/201 |

FOREIGN PATENT DOCUMENTS

| 641,095 | 4/1928 | France | 415/141 |
|---|---|---|---|
| 19,123 of | 1900 | United Kingdom | 418/9 |
| 737,082 | 9/1955 | United Kingdom | 60/412 |

*Primary Examiner*—Edgar W. Geoghegan
*Attorney, Agent, or Firm*—Friedman, Goodman & Teitelbaum

[57] ABSTRACT

A turbine drive system for operating a vehicle, where the drive system includes a common drive shaft powered by a turbine, and is used for propelling the vehicle and also for operating an air compressor. The air compressor supplies air under pressure which is stored in a pressure tank. The pressurized air operates the turbine which has a vane rotor. A return air flow path is provided from the turbine back to the compressor. By use of a vehicle fan, an air intake is provided to the compressor during forward movement of the vehicle. An auxiliary engine can be included for starting the compressor where the auxiliary engine can also be utilized as an auxiliary drive for the compressor. Additionally, a conventional vehicle engine can be included which operates the same drive shaft and which can work in conjunction with the turbine drive system.

9 Claims, 5 Drawing Figures

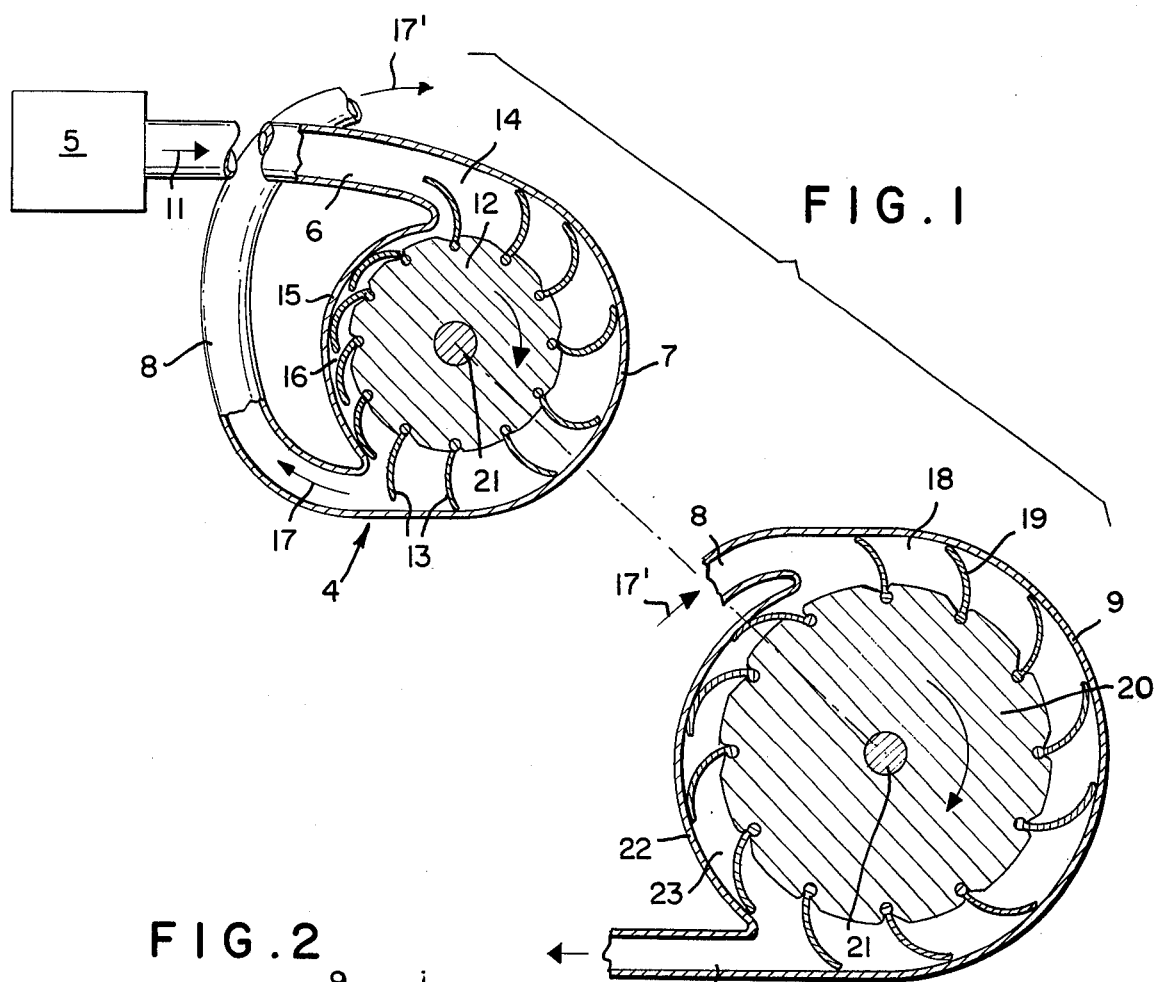
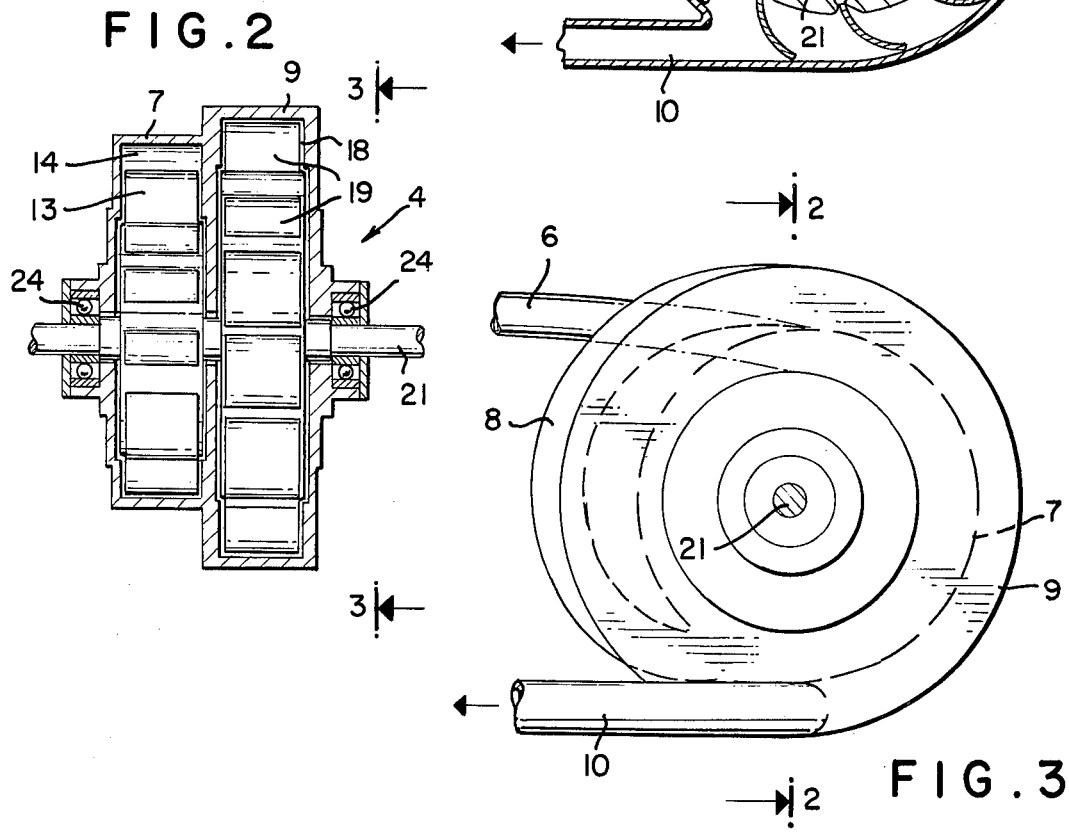

TURBINE DRIVE SYSTEM

RELATIONSHIP TO OTHER APPLICATIONS

This invention is a Continuation-In-Part application of Ser. No. 581,819, filed on May 29, 1975, and now abandoned.

BACKGROUND OF THE INVENTION

This invention relates to a turbine drive system, and more particularly to an improved system which can operate a vehicle either alone or in combination with a conventional engine, in order to reduce the amount of fuel or other energy source needed to propel the vehicle.

Vehicles are used in constantly greater numbers to provide transportation for individuals as well as for mass conveying. With the increased use of such vehicles, the amount of energy utilized to propel such vehicles is constantly increasing. Typically, vehicles are of the internal combustion type which utilize gasoline or other fossil fuels to propel the vehicle. Because of the inefficiency of the conventional internal combustion engine, the amount of fuel required to propel the vehicle is quite considerable. As a result of reducing supplies of such fuels, the cost of operating a vehicle has become an economic burden.

Numerous attempts have been made to resolve the problem of the increased cost of operating vehicles. Some attempts are directed to improve the operating efficiencies of existing engines in order to reduce the amount of fuel consumption needed to propel the vehicle. Other attempts have been directed to utilize different types of engines to drive the vehicle, which would entirely eliminate the use of fossil fuels. For example, numerous proposals have been suggested for electric vehicles operated by storage batteries. The batteries can be recharged at intervals in order to maintain their energy level for driving the vehicle.

While such proposed systems are attempts to reduce vehicle operating costs, thus far there has not been provided a satisfactory drive system for a vehicle which would sufficiently reduce the amount of fuel needed for propelling the vehicle.

One of the reasons for the lack of success of such proposals is that each of these proposed drive systems are based upon the utilization of an external energy source for driving the vehicle. Such energy sources are either the fuel in the combustion engine or the storage battery in the electric motor. However, by relying entirely upon an external source of energy to drive the vehicle there is not provided sufficient reduction in the source of fuel to satisfactorily reduce the operating costs of the vehicle.

Rather than entirely rely upon an external energy source, it is possible to utilize the inherent momentum of the moving vehicle and convert such momentum into useful energy to drive the vehicle itself. By focusing the attention of the drive system upon utilization of the inherent motion of the vehicle, it is possible to reduce the need of external energy sources to merely overcome frictional losses and initial starting of the engine. However, once the vehicle is in a state of propulsion, the existing movement of the vehicle can then be utilized to substantially propel the vehicle itself with the need of only a very minimal amount of external energy to overcome various losses.

The present invention utilizing such movement of the vehicle to drive the vehicle itself, includes a combination compressor and turbine set which operate on a common shaft, which shaft also serves as the drive shaft of the vehicle itself. The forward motion of the vehicle, and especially with the aid of the vehicle fan, produces sufficient suction of air into the compressor. Operated by the drive shaft, the compressor pressurizes the air and stores it in a storage tank which provides the source of high pressure air to drive a turbine of the rotor vane type. The turbine operates the drive shaft to propel the vehicle and also to operate the compressor. A return path is provided for the air back into the compressor. With the aid of an auxiliary engine for starting and overcoming frictional losses, as well as at such times as the momentum of the vehicle is insufficient to supply an adequate supply of compressed air, it is possible to reduce the amount of external energy needed to propel the vehicle. Such turbine drive system can be used independently of, or in conjunction with, a conventional engine of either the internal combustion or electric motor type in order to provide a more efficient operation of a vehicle.

In order to derive the greatest amount of energy from the pressurized fluid, typically air, it is also necessary to provide a highly efficient turbine. Prior fluid drive turbines have utilized only a minor portion of the available energy from the fluid because of the inherent engineering construction of the turbine elements themselves. Such construction has been based on the assumption that the additional quantities of energy of the turbine effluent of the conventional turbine is of insufficient magnitude to be of interest or economy in further harnessing the remaining energy thereof. However, utilizing an improved, more efficient type of turbine device it is possible to further reduce the loss of potential working energy and thereby provide an exceedingly efficient turbine which will be able to drive the vehicle.

SUMMARY OF THE INVENTION

Accordingly, an object of the present invention is to provide a turbine drive system for propelling a vehicle.

Still a further object of the present invention is to provide a combined compressor and turbine operating on a common drive shaft which can utilize the inherent movement of a vehicle to substantially provide the energy needed to drive the vehicle itself.

Yet another object of the present invention is to provide a turbine drive system which can be utilized as an aid to conventional engine drive systems for propelling a vehicle.

Another object of the present invention is to provide a turbine drive system which can utilize the forward movement of the vehicle to supply air to a compressor which compresses the air and drives a turbine, which in turn operates the vehicle and also serves to operate the compressor.

A further object of the present invention is to provide a turbine drive system for a vehicle which utilizes the inherent motion of the vehicle to substantially provide sufficient energy to operate the vehicle.

Another object of the present invention is to obtain a novel and more efficient fluid turbine.

Still a further object of the present invention is to obtain a practical, novel combination for utilizing fluid from a stored source for driving of a drive shaft at a high efficiency.

Yet a further object of the present invention is to provide a turbine drive system for a vehicle utilizing a highly efficient turbine to overcome the aforementioned difficulties of prior art drive systems.

Briefly, the invention provides a drive system for operating a vehicle and including a vehicle drive means which propels the vehicle. A compression means operated by the vehicle drive means supplies a fluid under pressure. The fluid under pressure is received and stored in a storage means which serves as the source of pressurized fluid for a turbine means having a vane rotor. The turbine means is responsive to the fluid under pressure for operating the vehicle drive means to propel the vehicle and also operate the compression means. A return flow path is provided from the turbine to the compressor for returning the fluid.

In an embodiment of the invention, the vehicle drive means comprises a common drive shaft through which is coupled the compression means and the turbine means. The common drive shaft also serves to operate the vehicle.

When the compression means comprises an air compressor, the forward movement of the vehicle supplies the air to the compressor. Such supply can be enhanced by the use of a fan operated by the same common drive shaft to supply air to the air compressor.

An auxiliary engine can be included to provide starting of the compressor and, by including sensors to determine the efficiency of operation of the vehicle, the auxiliary engine can occasionally be utilized to operate the compressor when the operation of the vehicle falls below a predetermined level. The turbine drive system can be used independently of, or in conjunction with, a conventional engine for propelling the vehicle.

The turbine provided is one of high efficiency and includes a support structure defining enclosures which are functionally separate from each other and provide first and second turbines for driving of a common drive shaft. The first turbine is engineered to receive the pressurized fluid and for operating at a given predetermined leverage of drive of the drive shaft. The second turbine is engineered to operate at increased leverage with regard to the residual energy within the effluent gas being emitted from an outlet of the first turbine. This can be achieved by virtue of the second turbine having a greater diameter than the first to result in greater leverage, since the force of a residual nature of the effluent gas would be significantly less than that driving the first turbine.

In a preferred embodiment the turbines include baffles which are of a collapsible nature and are specifically collapsible in the direction opposite to the direction of drive of the turbine, in order to effectively squeeze out the gas from the first turbine baffles in order to more efficiently drive the second turbine. Collapsible baffles are more importantly present as part of the first turbine than the second turbine. The interconnection between the first and second turbines is provided as a continuous spiral arrangement to enhance the circular motion of the fluid through the turbines and eliminate vortexes, pressure drops and frictional losses being introduced in passing from one turbine to the next.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a cross-sectional, exploded side view, showing the first and second turbine conduit structures being mounted around and drivable of a common axis or shaft, in side-by-side relationship, with the input conduit to the second being a spiral continuation of the output conduit of the first, whereby the two turbines are in serial flow relationship;

FIG. 2 is a cross-sectional side view taken along lines 2—2 of FIG. 3, further illustrating the operating mechanisms and structures of the combination of FIG. 1;

FIG. 3 illustrates an elevational side view of the embodiment of FIGS. 1 and 2, as taken along lines 3—3 of FIG. 2;

In the various figures of the drawing, like reference characters designate like parts.

DESCRIPTION OF THE PREFERRED EMBODIMENTS

Figure 4:
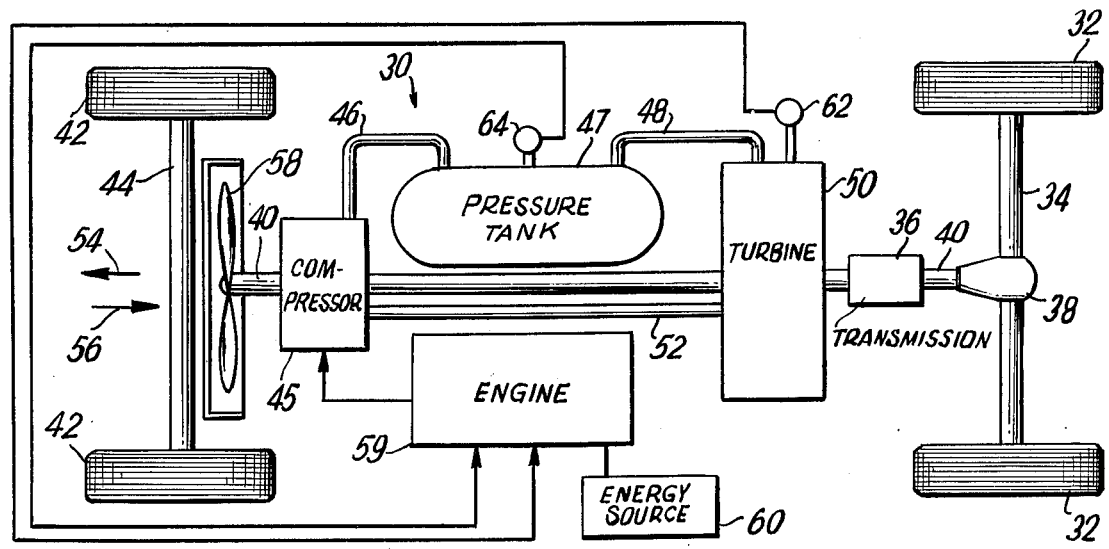
FIG. 4 is a schematic representation of the turbine drive system for operating a vehicle, in accordance with the present invention.

Referring to the drawings and firstly to FIG. 4, there is shown a schematic drawing of the turbine drive system 30 which can be utilized for propelling a vehicle and reducing the amount of external energy needed for such propulsion.

The vehicle typically includes a conventional set of rear wheels 32 mounted on a common axle 34, a vehicle drive having a conventional transmission 36, and a conventional differential 38 connected to the axle 34. A drive shaft 40 is also provided. Such drive systems are typical in most vehicles, and well known in the art. Additionally, a conventional set of front wheels 42 are provided on a front axle 44. Generally, the rear wheels of the vehicle are used for driving. However, in many cases front wheel drive can also be utilized, as is known in the art.

The differential 38 is conventional in character, being operative to permit the wheels 32 to rotate at different speeds, as when the vehicle is rounding a corner. The transmission 36 is operative to select a desired vehicle speed, or to reverse the vehicle. Since these components are well known in the art, details of their construction and operation are omitted for brevity, it being important primarily to note that they are merely exemplary of one form of vehicle drive which is operable by means of the turbine drive system of the present invention.

The turbine drive system 30 includes, generally, a compressor 45 which provides a fluid under pressure through a conveying tube 46 to be stored in a pressure tank 47. The fluid from the pressure tank passes through the conveying tube 48 to a turbine 50 having a vane rotor and whose shaft is coupled to the transmission drive shaft 40 which serves to drive the vehicle. The fluid from the turbine 50 can pass through the return conveying tube 52 back to the compressor 45. The compressor 45 is coupled to the same shaft 40 which serves as the drive shaft for the vehicle and which is operated by means of the turbine 50. When the compressor 45 is an air compressor, the movement of the vehicle serves to aid in the supply of the air. As the vehicle moves in the direction of the arrow 54, air is forced in the opposite direction shown by the arrow 56 and into the compressor 45 to aid in the compression of the air. A fan 58 can be mounted on the drive shaft 40, operative by means of the turbine 50 to aid in the suction of air into the compressor 45.

An engine 59, typically any conventional electromotor or other type, is included to operate the compressor 45 in initially starting it. When there is insufficient forward movement of the vehicle, the engine 59 can aid in driving the compressor 45. An energy source 60 can be provided to operate the engine 59. Such energy source can be fuel, such as gas, or can be electric storage batteries. In the case of electric storage batteries, a generator can also be included which can serve to recharge the batteries during the operation of the vehicle at high speed, such as during downhill running or at other high speed operation of the vehicle. Additionally, the batteries can be recharged conventionally, or by having available a plug which can be plugged into a recharging station for general recharging of the batteries.

There are also shown sensing devices, such as the speed sensor 62 which is typically shown connected to the turbine. However, it could also be connected directly to the drive shaft or other rotating portion of the drive system. A pressure sensor 64 is also shown, and is typically connected to the pressure tank. However, it could also be connected to other portions such as the output of the compressor or the input to the turbine. Each of these sensors gives an output to the engine 59 whereby, when there is either insufficient speed of the vehicle or insufficient pressure of the air in the tank, the engine will commence operation to provide auxiliary driving of the compressor 45.

In operation of the device shown in FIG. 4, the engine 59 will initially be utilized to start up the compressor 45. The air, or other fluid being used, will be compressed and stored in the pressure tank 47 and the fluid will then serve to drive the turbine 50. The turbine serves to rotate the shaft 40 which propels the vehicle and also operates the compressor. As the vehicle continuously moves forward, the movement of the vehicle serves to suck in the air into the compressor. The fan 58 aids in such suction of air. Accordingly, the movement or momentum of the vehicle is converted into energy which is then used to further propel the vehicle. The engine 59 can be used as an auxiliary aid during such times as there is insufficient air pressure or insufficient speed of the vehicle. The engine 59 can also be utilized occasionally to overcome frictional losses and other losses inherent in the system. However, it will be recognized, that the amount of external energy needed through the use of the engine 59 will be minimal, since it will only be utilized a part of the time to propel the vehicle, where the momentum and movement of the vehicle will be utilized the other part of the time to further propel the vehicle by converting such momentum into a driving force of energy for the vehicle as set forth above.

Figure 5:
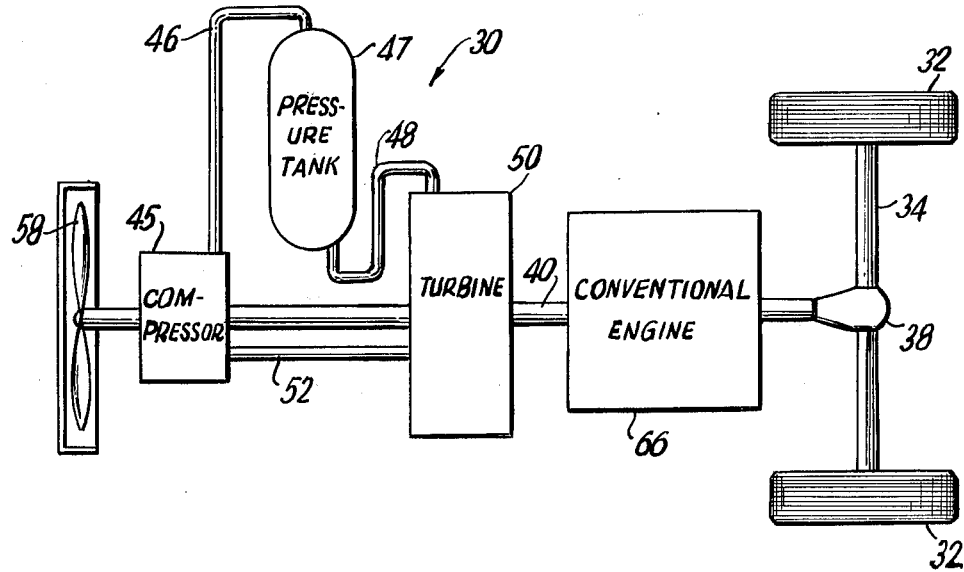
FIG. 5 is a schematic representation showing another embodiment of the turbine drive system for driving a vehicle, in accordance with the present invention.

The drive system shown in FIG. 4, in many cases, can be used independently for propelling the vehicle. However, sometimes, because of the great amount of frictional losses, or other losses, the inherent momentum of the vehicle may be insufficient to provide adequate speed to the vehicle. In such cases, the turbine drive system shown in FIG. 4 can be used in conjunction with a conventional engine. Specifically, as shown in FIG. 5, the turbine drive system shown generally at 30 is again repeated and includes the compressor 45 providing the pressurized fluid through the tube 46 to the pressure tank 47 which provides the pressurized fluid through the conveying tube 48 to the turbine 50 operating the shaft 40. The fluid is returned through the flow tube 52 back to the compressor. Th fan 58 is again included to aid in the suction of air during the movement of the vehicle. The turbine operates the common drive shaft 40 to operate the drive wheels 32 on the axle 34 through the differential 38, as is known in the art.

However, as shown in FIG. 5, there is also included a conventional engine, shown generally at 66, which is also located to operate the same common drive shaft 40. The conventional engine 66 can be an internal combustion engine driven by fossil fuel such as gas, as is well known in the art. Additionally, it can be an electric engine driven by storage batteries, also of any type well known in the art. While a conventional engine is utilized, it will be appreciated, that since this engine is aided by the turbine driven system 30 of the present invention, the amount of energy necessary to be supplied by the conventional engine will be greatly reduced because of the large amount of energy already supplied by the turbine drive system of the present invention. As a result, utilizing the inherent momentum of the vehicle to supply the turbine drive system of the present invention reduces the amount of external energy needed either through the batteries or the gas.

In order to achieve a greater efficiency from the fluid passing through the turbine, there is shown an improved two stage fluid turbine device illustrated in FIGS. 1–3. In these figures there is shown a fluid turbine 4 having a fluid source such as the compressed air tank mechanism 5 (or the above mentioned compressor 45 and tank 47), which furnishes fluid in the direction 11 through the small diameter turbine rotor 12 by means of the inlet conduit 6 (which can be connected to the tube 48). The fluid enters into the space 14 and drives flexible baffles 13 to thereby cause the rotor 12 to rotate in the direction shown within the casing 7. As the rotor continues to rotate, the baffles 13, which are pivoted at their bases on the rotor, each collapse within the space 16 against the wall 15 while the squeezed out fluid continues in the direction 17 through the conduit 8 and continues in the direction 17'.

The fluid passes through the small rotor outlet conduit 8 and continues into the larger diameter rotor 20. The tube 8 thereby also serves as the inlet conduit for the larger diameter rotor 20. The fluid enters into the space 18 and is directed against the flexible baffles 19 within the casing 9 to rotate the rotor 20 in the direction shown. Both the rotor 12 and the rotor 20 are mounted in fixed relationship on the common shaft 21 (such as shaft 40), so that both rotors contribute to the driving of that shaft which can be mounted on typical bearings 24. Fluid eventually leaves the turbine by means of the outlet 10 (which can be connected to the tube 52), being squeezed from the collapsing baffles 19 as these baffles move against the wall 22 within the space 23.

It should be noted that the two turbine sections are interconnected by means of the spiral conduit 8 which serves as the outlet conduit of one turbine section and the inlet of the next adjacent turbine section. The conduit 8 is in the form of a spiral to thereby permit the fluid to continue its direction through the conduit 8 and enter the second section of the turbine in a proper continuous directional flow. By interconnecting the two sections with the spiral conduit 8, there is avoided having the fluid twist and bend causing internal vortex flows, or any additional pressure drops within the system. The fluid can therefore continue directly through the first rotor and, without changing direction, flow in a path of continuous circular movement into the second turbine. This spiral conduit eliminates much of the friction and internal directional changes which would tend to reduce the pressure and lower the efficiency of the turbine.

It should also be noted that the baffles fold one onto the other as they pass through the reduced sections of the respective casings to thereby close the passageways and force the fluid through the outlet conduits.

Utilizing the improved rotor in the turbine shown in FIGS. 4 and 5, results in a most efficient turbine drive system which utilizes almost all of the energy of the pressurized fluid to turn the turbine and thereby cause the common drive shaft of the vehicle to operate at a high speed. At the same time, the common shaft serves to operate the compressor. Although not shown, it is possible to heat the compressed fluid in the pressure tank and thereby achieve an even higher speed as the turbine rotates. However, of course, additional energy will have to be expended in order to heat the fluid in the pressure tank. The heating of the fluid would of course depend upon the amount of efficiency which would be gained as compared to the amount of additional fuel which would be needed to produce such heat.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A system for operating a vehicle, comprising:
   a. vehicle drive means for propelling the vehicle;
   b. compression means operative by said vehicle drive means for supplying a fluid under pressure;
   c. storage means for receiving and storing the fluid under pressure;
   d. turbine means having a vane rotor responsive to the fluid under pressure from said storage means for operating said vehicle drive means;
   e. a return flow path from said turbine means to said compression means for returning the fluid to said compression means;
   f. said vehicle drive means including a common drive shaft coupled to drive wheels of the vehicle, said compression means and said turbine means being coupled to said drive shaft;
   g. said turbine means including a support structure defining an enclosure space, said drive shaft extending through said enclosure space and being mounted on the support structure, said enclosure space being divided into a first section and a second section substantially isolated from each other;
   h. a first rotary turbine of a predetermined small radius mounted within said first section on a first portion of said drive shaft, said first turbine being rotatable within said first section;
   i. a second rotary turbine of a predetermined large radius substantially larger than said predetermined small radius being mounted within said second section on a second portion of said drive shaft, said second turbine being rotatable within said second section;
   j. said first and second turbines respectively being adapted for driving said common drive shaft and for working in series flow relationship with said fluid under pressure;
   k. said support structure defining a first inlet through which said fluid under pressure can enter and drive said first rotary turbine, said support structure further defining a first outlet from said first section and a second inlet to said second section; and
   l. a spiral conduit section interconnecting said first outlet and said second inlet, and said support structure defining a second outlet from said second section, whereby residual energy from the fluid from said first section is utilized in said second section.

2. A system in claim 1, further comprising motor means connected to said compression means for starting the operation thereof.

3. A system as in claim 2, further comprising sensing means for sensing an effective operation of said vehicle drive means and coupled to said motor means for causing said motor means to function as an auxiliary drive for said compression means when the effective operation is below a predetermined level.

4. A system as in claim 3, wherein said sensing means includes a speed sensor coupled to said turbine means to sense a predetermined speed of the turbine means.

5. A system as in claim 3, wherein said sensing means includes a pressure sensor coupled to said storage means to sense a predetermined pressure of the fluid therein.

6. A system as in claim 1, including fan means, said compression means being an air compressor, and said fan means being coupled to said air compressor for aiding the air intake into said air compressor.

7. A system as in claim 1, further comprising a conventional vehicle engine coupled to said common drive shaft and operating in conjunction with said turbine means for propelling said vehicle drive means.

8. A system as in claim 1, wherein each of said first and second rotary turbines includes collapsible baffles against which said pressurized fluid impels to drive the respective first and second rotary turbines, said collapsible baffles being mounted for collapsing in a direction opposite to a direction of drive, and hub structure mounting said collapsible baffles thereon, said hub structure including a hub portion for each of the first and second rotary turbines and being rotatable with the collapsible baffles mounted thereon.

9. A system as in claim 8, wherein circumscribing portions of the support structure of the first section are located radially outward from said drive shaft and are located between the first inlet and the first outlet, said circumscribing portions being at a radial distance from said shaft substantially less than the radial distance of the rest of said first section, such that collapsible baffles of said first section are forced to become substantially totally collapsed upon engagement with said circumscribing portions to thereby eliminate gas from the first outlet, and other circumscribing portions of the support structure of the second section being located radially outward from said drive shaft and being located between the second inlet and the second outlet, said other circumscribing portions being at a radial distance from said shaft less than the radial distance of the rest of the second section, such that collapsible baffles of the second section are forced to become substantially totally collapsed upon engagement with said other circumscribing portions to thereby eliminate the gas from the second outlet.

* * * * *